United States Patent Office 3,499,954
Patented Mar. 10, 1970

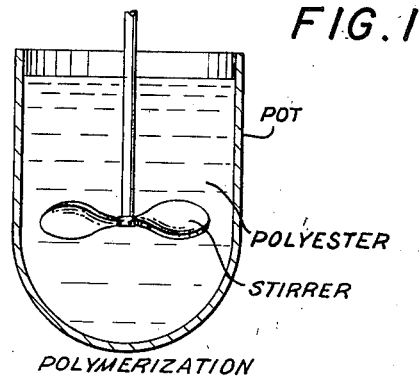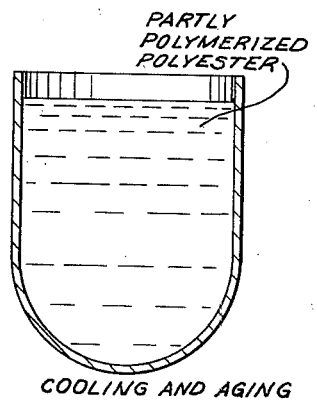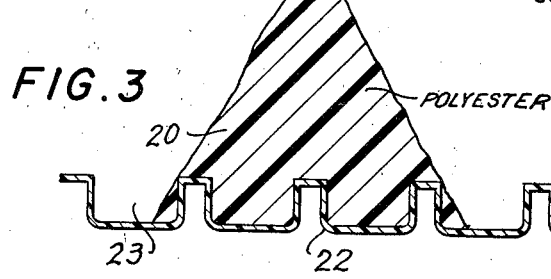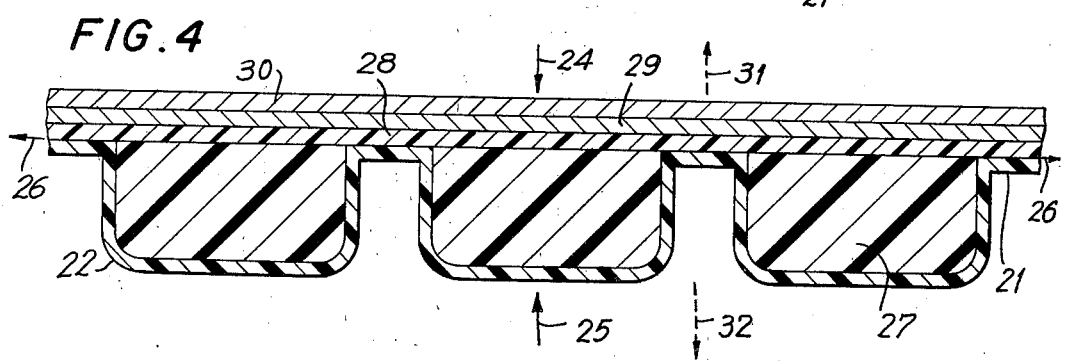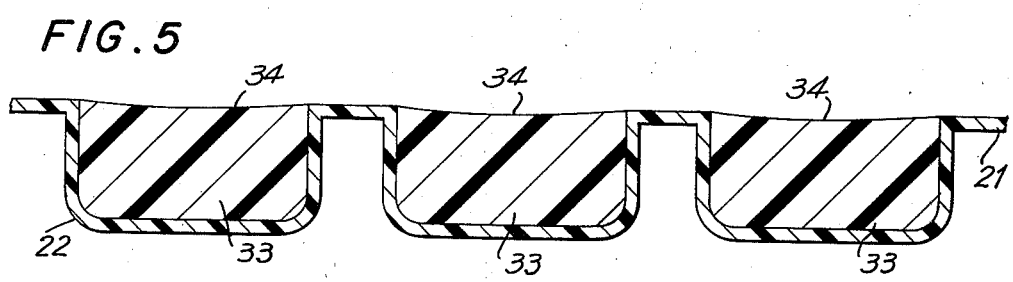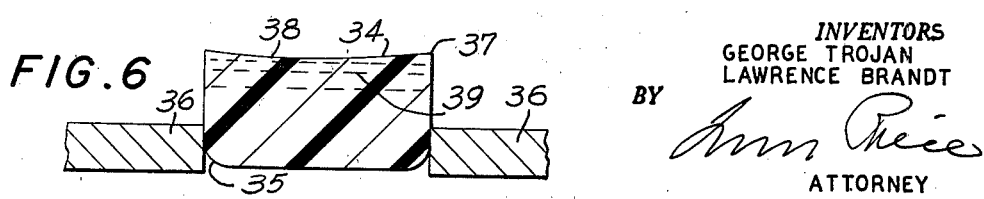
INVENTORS
GEORGE TROJAN
LAWRENCE BRANDT
ATTORNEY

3,499,954
METHOD OF MOLDING AND FORMING BUTTONS AND OTHER SMALL DISC-LIKE MOLDED ARTICLES
George Trojan, 4 Seville Lane, and Lawrence Brandt, 157 Sycamore Circle, both of Stony Brook, N.Y. 11790
Filed Mar. 23, 1967, Ser. No. 625,373
Int. Cl. B29d 19/02
U.S. Cl. 264—77                    7 Claims

ABSTRACT OF THE DISCLOSURE

The present disclosure relates to a process of forming plastic disc-like molded articles useful for buttons by stirring and heating a polyester liquid until its viscosity increases to a point well below the maximum viscosity point and before gelation and adding pearl essence during this process, then chilling and deaerating and molding.

---

The present invention relates to small disc-like molded articles and methods of molding and forming the same. Although the present invention will be particularly related to compositions for and methods and means of molding, shaping and forming synthetic polyester pearl buttons it has a much broader application to molding procedures in general and is not limited to the molding of small disc-like products.

Although the polyester compositions may be varied, they normally consist of 65 to 80% unsaturated esters of various dicarboxylic acids (maleic, fumaric and/or phthalic acids) and dihydroxy alcohols (ethylene glycol or propylene glycol) which are then cross-linked with 20 to 30% of compatible unsaturated monomers (styrene and/or diallyl phthalate).

It has been found that with such polyester resin compositions, it is desirable to change them into final solid heat, water, and solvent resistant) articles without inter,nediate gelation, since gelation tends to give uneven appearance and composition. Uniform appearance is particularly desirable where the molded articles are subsequently cut, recessed, and drilled to form buttons suitable for attachment to men's, women's and children's garments.

In forming the final article, it has been found most satisfactory to take the original partly polymerized polyester composition and slowly polymerize it at temperatures between 100° F. to 150° F. with substantial agitation, with various peroxide catalysts in small amounts, which will be effective between 75° F. to 275° F.

The polymerization process is stopped well before maximum viscosity stage by chilling the resin and the adding of inhibiters such as hydroquinone to the resin so that gelation does not result. Then the mixture is desirably combined with a small quantity of a pearl essence of the flat scale type. Before gelation, the composition is subjected to a pressure of the order of 100 to 1000 pounds per square inch and a temperature of 200° F. to 275° F., with a squeezing flow so as to cause an alignment and proper location of the pearl crystals so that they will align themselves in parallelism with the upper and lower surface of the sheet or disc-like articles that are to be formed without any intermediate gelation operation, and so that the final articles are forthwith produced with avoidance of any intermediate gelation in their heat resistant, solvent resistant and hard structure.

These articles are desirably so formed that they will be flat or dish-shaped on one side and have a curved or more or less spherical contour on the other side. This disc is then grasped and turned on its curved or spherical side so that the slightly dished or flat face will be cut to give the final button shape and design.

In carrying out this procedure, it has been found most satisfactory to preform a mold for the small discs or button precursors by vacuum molding a thin thermoplastic sheet of resinous material ranging from .001 to .005 of an inch or more, if necessary. This preformed vacuum mold is made so that it exactly matches the mold used to cure the resin under heat and pressure. The center of the preformed sheet which has the recesses formed therein then receives a central conical-shaped mass of partly polymerized but ungelated polyester resinous material, which is then squeezed or pressed below sheets of cellulose acetate, glassine, kraft paper or cardboard, or suitable release papers.

When the pressure is applied to both sides of this sandwhich material, the sides of the laminate sheets are left open for escape of any excess polymerized but ungelated resinous material. After a suitable treatment, which may take from 1 to 10 minutes at 195° F. to 350° F., the sheets are separated and the discs removed after inspection to see if any discs have been spoiled.

It has been found that under these circumstances, the organic or inorganic luster-producing pearl essence is so satisfactorily distributed as to give a most desirable pearl luster over the entire face. The articles are most uniform and the pearl essence is most satisfactorily oriented in a laminar condition with the laminates being parallel to the top and bottom faces, giving a most desirable uniform mother-of-pearl appearance.

A most important feature of the present invention resides in the fact that at all times the polymerization before molding is stopped well below the point of maximum viscosity. Actually, it has been found most satisfactory to stop the polymerization when the viscosity varies between one-half to two-thirds or certainly not over three-quarters of the maximum viscosity with the result that a fluid composition will always be distributed onto the formed sheet, and then the heat and pressure is applied while the polyester liquid is still readily flowable and well below the gelation point and also well below the point of maximum viscosity.

The drawings show diagrammatically one procedure according to the present invention.

FIG. 1 shows a pot with a stirrer containing the polyester resin which may be heated by means of a jacket to a temperature which will result in slow polymerization and increase in viscosity. This procedure is discontinued when the viscosity increases from about 1500 centipoises to 12,000 to 15,000 centipoises, when the viscosity is approaching about one-half of its maximum range, but in any case well below maximum viscosity.

The polyester in the pot of FIG. 1 desirably contains low and high temperature polymerization catalysts, and the stirring operation extends between 1 hour to 9 hours.

In FIG. 2, the partly polymerized polyester, still well below its maximum viscosity point, is chilled to a temperature of 75° F. to 100° F. It is then deaerated under vacuum for a period of about 6 hours.

In FIG. 3, the polyester mass 20 is poured onto the central portion of a formed sheet 21. The polyester resin is now in a polymerized condition but has a viscosity well below its maximum viscosity point. The recessed sheet 21 is desirably formed by vacuum forming thermoplastic materials such as cellulose acetate, polypropylene, polyvinyl alcohol, and cellulose acetate-butyrate, on a replica of the mold used to cure the polyester articles. The formed sheet 21 has bevelled corners, indicated at 22, so that the lower face of the disc molded in each recess 23 will be bevelled and the upper face will be flat. This is done to identify the face and back side of the button blank.

In FIG. 4, the structure is shown as if it had been pressed in a mold with upper and lower platens indicated by the arrows 24 and 25. The excess polyester would be squeezed out to the sides as indicated at 26, without being restrained by any bag structure or yieldingly clamping retractable ring, and the polyester resinous material, as indicated at 27, would be transformed from a medium viscosity condition, short of gelation, over to a solidified, rigid structure, with excess resin removed from the sides or corners of the mold. The temperature of the transformation may range between 195° F. to 350° F., and the time may vary from one to ten minutes. Desirably, the upper platen 24 presses down on a sheet of cellulose acetate upon which is placed a sheet of cardboard 30.

After the hardening is complete, the platens 24 and 25 may be opened as indicated by arrows 31 and 32, and the pre-vacuum formed sheet 21 may be removed. Each recess will contain a solidified polyester button 33, having a flat or slightly dish-shaped upper face 34, as shown in FIG. 5. In this condition the buttons may be inspected and any of those showing defects may be removed and discarded.

The remaining buttons, then having the shape as approximately indicated in FIG. 6, will have bevelled lower back edges 35, flat top or slightly dished front face 34. By placing suitable jaws in the positions indicated at 36, they may be turned to trim the edges 37 or cut a shape into the upper face 34.

As indicated diagrammatically at 39, the pearl essence which is added to the pot in FIG. 1 will have been squeezed into a laminar arrangement which gives maximum brilliancy to the buttons.

As a specific example, Laminae 4120, a polyester resin supplied by the American Cyanamid Company, which contains about 25% styrene, is stirred at a temperature of 130° F. for about 7 hours. Added to the polyester resin, is 0.01% of methyl ethyl ketone peroxide (a low temperature catalyst) and about 0.5% of U.S.P. 245, a high temperature catalyst as supplied by the United States Peroxygen Corp.

This agitation or mixing is carried on at about 130° F. for 1 to 9 hours until the viscosity achieves about ½ to ⅔ maximum viscosity, or about 12,000 to 15,000 centipoise.

Then the heated and partly polymerized polyester liquid is chilled to 85° F. and about 0.01% of hydroquinone is added. The cooling procedure takes about two hours, after which the chilled resin is deaerated by vacuum for a period of from 6 to 15 hours.

The pearl essence may be added either during the initial stirring operation or during the chilling operation. The product, after deaeration, is then poured in desired quantity onto a vacuum formed sheet as previously mentioned, and is compressed against superimposed layers of cellulose acetate sheet and cardboard at a temperature of 235° F. for a period of 1½ minutes, to give the final hardened resin discs or button blanks.

The resins that can be used with this molding process are not limited to polyester resins but any liquid, addition-type, thermosetting resin can be utilized. These include epoxy resins, diallyl phthalate, and other allyl resins.

This invention is not to be construed as being limited to compression molding. It can be used in injection molding or a form thereof and also vacuum forming molding.

Having now particularly described and ascertained the nature of the invention, and in what manner the same is to be performed:

What is claimed is:

1. A process of forming plastic thin circular molded articles containing pearl essence useful for buttons, comprising preparing a partly polymerized ungelated chilled viscous polyester liquid resinous material having a viscosity of 12,000 to 15,000 centipoises at temperatures between 75° F. to 250° F., providing a thin stiff rectangular horizontal plastic mold sheet with spaced circular cylindrical depending recesses therein, adding the liquid resinous material to the center of the sheet in a mound form to fill said recesses and to spread out over the sheet, filling said recesses from the center of the sheet to the edges of the sheet, placing a top plastic flat releasable sheet above the mold sheet carrying the resinous material and then applying heat and pressure to the sheets separating the sheets and removing the formed circular articles.

2. The process of claim 1, said heat and pressure being in the order of 100 to 1500 pounds per square inch at a temperature of 195° F. to 275° F. for one to 20 minutes.

3. The process of claim 1, in which the upper sheet consist of sheets of cellulose acetate and cardboard and the final step includes molding at 100 to 1500 pounds per square inch at a temperature of 195° to 275° F. for one to 20 minutes.

4. The process of claim 1, said preformed mold sheet being of resinous material having a thickness of .001 to .005 of an inch, applying to the central top side of said sheet a conical shaped mass of partly polymerized ungelated polyester resinous material, then applying a pressure sheet thereover, then applying heat and pressure for 1 to 10 minutes at 195 to 350° F. to fill the recesses in the preformed sheet and squeezing excess resinous material which will escape at the sides, thus causing orientation of the pearl essence material.

5. The process of claim 1, the upper sheet consisting of a lower sheet of cellulose acetate and an upper sheet of cardboard, placing the preformed sheet containing the resinous composition with the sheets of cellulose acetate and cardboard placed thereon into a heated mold fitting the recesses in the preformed sheet, followed by the application of a pressure of up to 1500 pounds per square inch at a temperature of 195° F. to 275° F. for one to 20 minutes, followed by removal of the cellulose acetate and cardboard sheets and separation of the molded disc-like articles.

6. The process of claim 1, said liquid resinous material being deaerated before being placed upon the mold sheet under a vacuum for a period of about six hours.

7. The process of claim 1, in which the polyester resin liquid containing about 25% styrene is stirred at a temperature of 130° F. for seven hours in the presence of 0.01% of methyl ethyl ketone peroxide as a catalyst, said stirring being continued for a period of one to 9 hours until the viscosity achieves ½ to ⅔ maximum viscosity and about 12,000 to 15,000 centipoises, then chilling the liquid resin to 85° for about two hours and then deaerating with a vacuum for about 6 to 15 hours and adding pearl essence during the chilling operation and pouring the liquid resin upon a preformed sheet and then compressing it against superimposed layers of cellulose acetate sheet and carboard at a temperature of 235° F. for a period of 1½ minutes, removing the superimposed layers and then removing the hardened resin discs.

References Cited

UNITED STATES PATENTS

| | | | |
|---|---|---|---|
| 2,652,597 | 9/1953 | Sucher | 264—316 XR |
| 2,962,764 | 12/1960 | Trojanowski | 264—316 XR |
| 3,058,165 | 10/1962 | Purvis | 264—313 XR |
| 3,305,618 | 2/1967 | Sucher | 264—316 |
| 3,306,956 | 2/1967 | Barnette | 264—313 XR |
| 2,643,983 | 6/1953 | Dangelmajer | 260—40 |

ROBERT F. WHITE, Primary Examiner

R. A. KUCIA, Assistant Examiner

U.S. Cl. X.R.

264—90, 102, 108, 213, 319